United States Patent [19]

Druseikis

[11] 3,808,629

[45] May 7, 1974

[54] ACTUATING MECHANISM FOR A DEPRESSED PARK WINDSHIELD WIPER SYSTEM

[75] Inventor: Frederick Druseikis, Kettering, Ohio

[73] Assignee: General Motors Corporation, Detroit, Mich.

[22] Filed: Nov. 29, 1972

[21] Appl. No.: 310,384

[52] U.S. Cl................................. 15/250.17, 74/600
[51] Int. Cl. .............................................. B60s 1/24
[58] Field of Search..................... 15/250.17; 74/600

[56] References Cited
UNITED STATES PATENTS

| | | | |
|---|---|---|---|
| 3,091,128 | 5/1963 | De Rees et al. | 15/250.17 X |
| 3,197,796 | 8/1965 | Kato et al. | 15/250.17 |
| 3,699,605 | 10/1972 | Bellware | 15/250.17 |

*Primary Examiner*—Edward L. Roberts
*Attorney, Agent, or Firm*—W. A. Schuetz

[57] ABSTRACT

In a preferred form, this disclosure relates to an actuating mechanism for use in oscillating a pair of windshield wipers across a windshield between inboard and outboard positions during running operation and to move the wipers to a depressed park position spaced from the inboard position when wiper operation is being terminated. The actuating mechanism includes a rotatable crank assembly having a crank shaft and a crank arm connected thereto. The crank arm is rotated about the rotational axis of the crank shaft through an orbit having a first radius during running operation of the wipers to move the same between their inboard and outboard positions and the crank assembly is both rotated and swivelled about its rotational axis to increase the throw of the crank arm of the crank assembly to effect movement of the wipers to a depressed part position when wiper operation is being terminated.

2 Claims, 8 Drawing Figures

PATENTED MAY 7 1974

ACTUATING MECHANISM FOR A DEPRESSED PARK WINDSHIELD WIPER SYSTEM

This invention relates to a depressed park type windshield wiper system, and more particularly to an actuating mechanism for oscillating a pair of windshield wipers across a windshield between inboard and outboard positions during running operation and to move the wipers to a depressed park position spaced from the inboard position when wiper operation is being terminated.

Depressed park type windshield wiper systems for automotive vehicles usually include a pair of windshield wipers drivingly connected to drive pivots rotatably supported by the body structure of the vehicle, an actuating mechanism including a rotatable crank assembly and a drive transmission operatively connected with the oscillatable drive pivots and the crank assembly. The actuating mechanism is operable to rotate the crank assembly through an orbit of a given radius during running operation to reciprocate the drive transmission and oscillate the wipers between their inboard and outboard positions and to increase the throw of the crank arm to move the wipers beyond their normal inboard stroke ends to a depressed park position when wiper operation is being terminated. The present invention provides a new and improved actuating mechanism for such a windshield wiper system.

Accordingly, an important object of the present invention is to provide a new and improved actuating mechanism for use in a depressed park type windshield wiper system and in which a rotatable crank assembly having a crank arm and a crank shaft is rotated so the crank arm moves through an orbit of a given radius during running operation to oscillate the wipers between their inboard and outboard stroke end positions and in which the crank assembly is both rotated and swivelly moved about its rotational axis to increase the throw of the crank arm of a crank assembly to effect movement of the wipers to their depressed park positions when wiper operation is being terminated.

Another object of the present invention is to provide a new and improved actuating mechanism for use in a depressed park type windshield wiper system, and in which the actuating mechanism includes a housing means, an annular element rotatably supported by the housing means for rotation about a given axis, a drive member spaced from the annular element and rotatably supported by the housing for rotation about the given axis, a motor means for driving the drive member, a crank assembly including a crank arm and a crank shaft which is rotatably supported by the annular element so that its rotational axis is eccentric to and skewed with respect to the given axis, a connection means for swivelly and drivingly connecting the crank shaft to the drive member and a parking mechanism operatively associated with the drive member and the annular element, and wherein the parking mechanism is operable to effect rotation of the crank assembly about its axis so that the crank arm rotates through an orbit having a given radius so that the wipers will be oscillated between their inboard and outboard positions during running operation and is operable to drivingly connect the annular element to the drive member so that the annular element and crank assembly are rotated together to effect swivelling as well as rotational movement of the crank assembly to increase the throw of the crank arm and thereby move the wipers to a depressed park position when wiper operation is being terminated.

The present invention further resides in various novel constructions and arrangement of parts, and further objects, novel characteristics and advantages of the present invention will be apparent to those skilled in the art to which it relates and from the following detailed description of the illustrated embodiment thereof made with reference to the accompanying drawings forming a part of this specification and in which similar reference numerals or characters are employed to designate corresponding parts throughout the several views, and in which.

Figure 1:
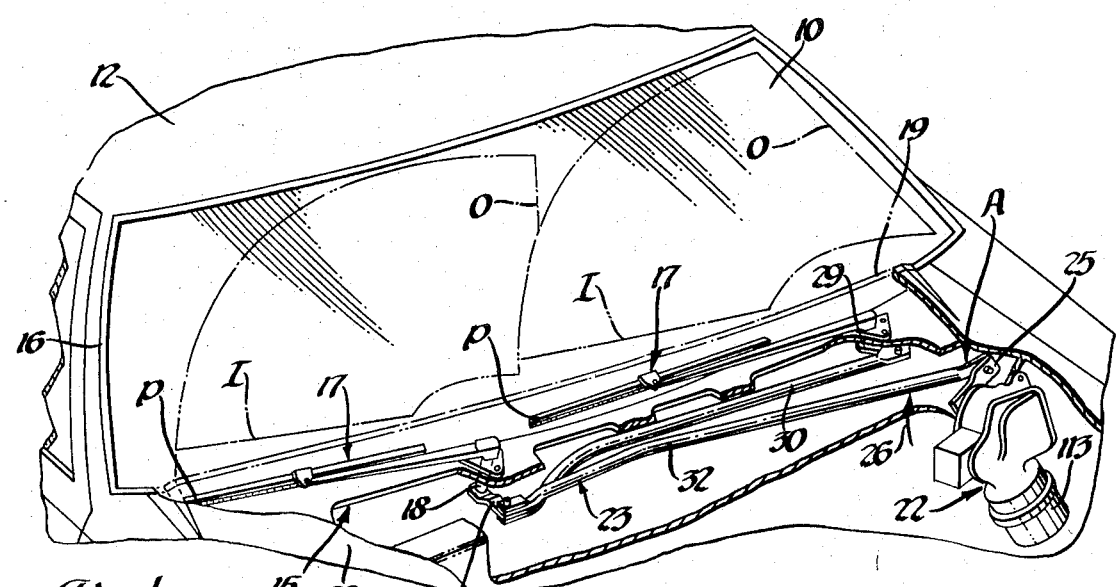
FIG. 1 is a fragmentary perspective view of an automotive vehicle having a windshield wiper system embodying the novel actuating mechanism of the present invention.

As representing a preferred embodiment of the present invention, FIG. 1 of the drawings shows a windshield wiping system A for wiping a windshield 10 of an automotive vehicle 12. The windshield 10 is supported by suitable body structure 15 of the vehicle 12 and its edges are surrounded by a reveal molding 16. The windshield wiping system A comprises a pair of suitable or conventional windshield wipers 17 which are drivingly connected to drive pivots 18. The drive pivots 18 are rotatably supported by the body structure 15 of the vehicle 12 at spaced locations adjacent the lower edge of the windshield 10.

The wipers 17 are adapted to be oscillated in tandem across the outer surface of the windshield 10 between inboard and outboard positions, designated by the letters I and O, during running operation and are adapted to be moved from their inboard position I to a depressed park position P adjacent the lower edge of the windshield 10 when running operation is being terminated. In the illustrated embodiment, the wipers 17 when in their parked position P are located within a transversely extending slot 19 defined between the outer surface of the windshield 10 and the rearward edge of the vehicle hood 20. The wipers 17 are thus concealed from view when in their parked position P.

The wipers 17 are oscillated between their inboard and outboard positions, I and O, and movable to their park position P, by a novel actuating mechanism 22 via a drive transmission or linkage means 23. The novel actuating mechanism 22 includes a rotatable crank assembly 24 having a crank arm 25 which is rotated in the direction of the arrow 26. The transmission linkage means 23 comprises a pair of crank arms 28 and 29 each having one end fixed to one of the drive pivots 18 and the other end thereof swivelly connected to a cross link 30. The linkage means 23 also includes a drive link 32 having one end swivelly connected to the crank arm 28 and its other end swivelly connected to a ball 33 carried by one end of the crank arm 25 (see FIG. 2). Rotation of the crank arm 25 in the direction of the arrow 26 causes the transmission linkage 23 to be reciprocated to cause the wipers to be oscillated in tandem across the outer surface of the windshield 10.

The crank arm 25 has an effective radius $R_1$ during running operation which causes the wipers 17 to be oscillated between their inboard and outboard positions I and O. When wiper operation is being terminated, the wipers 17 are moved beyond their inboard position I to their depressed park position P. This is accomplished by increasing the throw or radius of the crank arm to the radius $R_2$, and in a manner hereinafter described.

The novel actuating mechanism 22, besides the crank assembly 24, comprises a metal casting or housing means 40 having an opening 41 therethrough. The opening 41 has a first diameter portion 41a adjacent its upper end, an intermediate diameter portion 41b and an enlarged diameter portion 41c adjacent its lower end.

The housing means 40 rotatably supports an annular element 44. The annular element 44 along its outer periphery has a radially extending flange 45 which overlies and slidably engages the upper end of the housing 40 and an axially extending flange 46 which slidably engages the housing 40 along its inner periphery defining the opening portion 41a. The annular element 44 also has an axially and arcuately extending leg 48 depending from the annular flange portion 46, and for a purpose hereinafter described.

Figure 2:
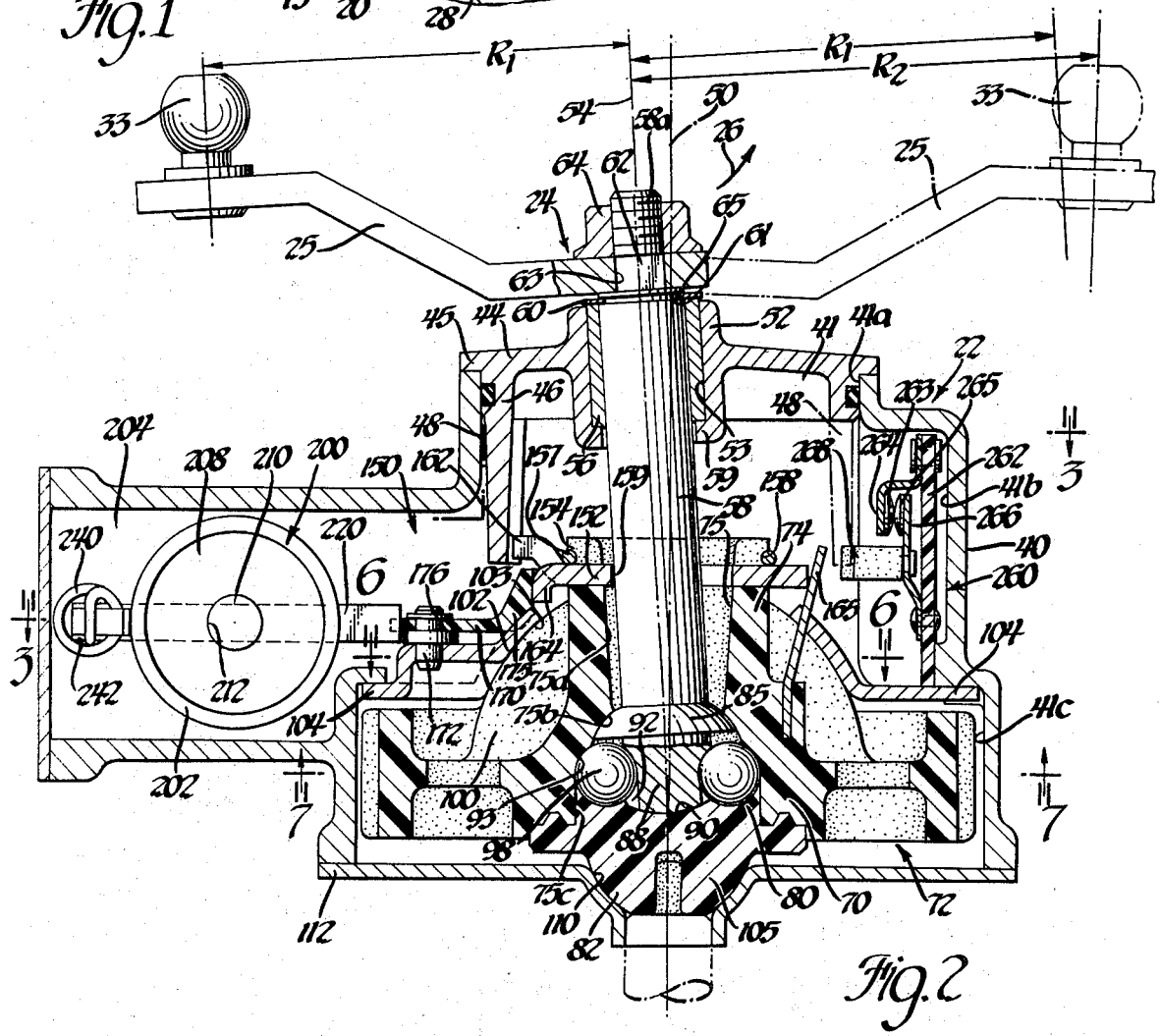
FIG. 2 is an enlarged sectional view taken approximately along line 2—2 of FIG. 1 of the actuating mechanism of the present invention.

The annular element 44 is rotatable about its rotational or given axis 50 and has a central hub portion 52. The hub portion 52 has a central through opening 53 whose central axis 54 is eccentric to and skewed with respect to the axis of rotation of the annular element 44, as best shown in FIG. 2. The hub portion 52 supports a sleeve bearing 56 which in turn rotatably supports the upper end of a crankshaft 58 of the crank assembly 24. The bearing 56 is held in place by an inturned flange 59 on the hub portion and a snap ring 60 which engages the upper end of the bearing 56 and is received in an annular groove 61 in the crankshaft 58. The crankshaft 58 at its upper end has a threaded section 58a and a section 62 of noncircular cross-sectional shape which is received within a complementary shaped opening 63 in the crank arm 25 to drivingly interconnect the crank arm 25 and crankshaft 58. The crank arm 25 is retained on the crankshaft 58 by a nut 64 which clamps the crank arm 25 against a shoulder 65 on the crankshaft 58.

The crank shaft 58 of the crank assembly 24 is drivingly and swivelly connected at its lower end to a drive member 70 of a drive mechanism 72. The drive member 70 is hereshown as being in the form of the worm wheel made from a suitable plastic material, such as nylon. The drive member or worm wheel 70 has a central hub 74 and the hub and wheel have a central opening 75 therethrough. The central opening 75 has an upper opening portion 75a of a diameter greater than the diameter of the crank shaft, an intermediate opening portion 75b which defines a generally spherical bearing surface in the sidewall of the hub portion 74, and a lower opening portion 75c which is adapted to receive an axially extending portion 80 of an end piece 82 secured to the drive member 70. The crank shaft 58 has a radially extending land or flange portion 85 intermediate its ends whose outer periphery is spherically shaped and adapted to seat within the spherically shaped opening portion 75b of the hub 74. Likewise, the crankshaft 58 adjacent its lower end 88 is spherically shaped and adapted to slidably mate with a spherically shaped inner surface 90 of the end piece 82. The spherical land 85 and end surface 88 enable the crankshaft 58 to be swivelly moved about its axis 54.

The crankshaft 58 is also drivingly connected to the drive member 70. To this end, the lower end of the crankshaft 88 has a plurality of radially and axially extending recesses 92 having curved or concave bottoms at spaced circumferential locations and the opening portion 75c of the hub 74 has radially outwardly and axially extending recesses 93 having curved bottoms. Disposed between the adjacent recesses on the crankshaft 58 and the drive member 70 are spherical balls 98.

The spherical balls 98 transmit torque from the drive member 70 to the crankshaft 58 in response to rotation of the annular drive member 70 and also allow the crankshaft 58 to swivel about its axis 54 while remaining drivingly connected to the drive member 70.

Figure 7:
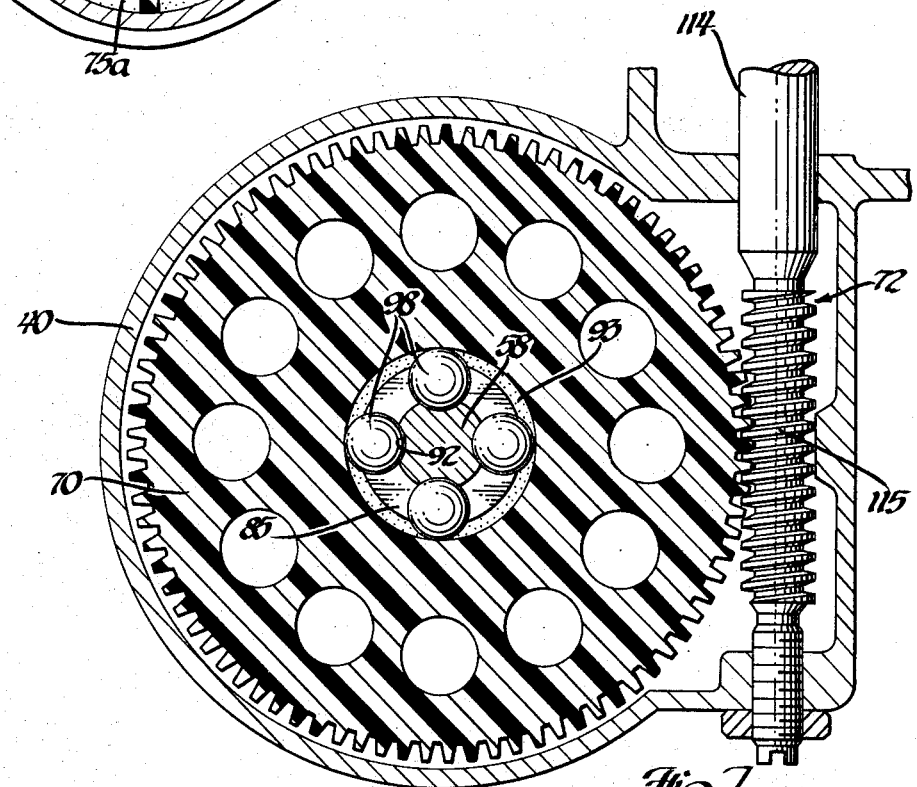
FIG. 7 is a fragmentary sectional view taken approximately along line 7—7 of FIG. 2.

The annular drive member or worm wheel 70 is rotatably supported by the housing means 40 for rotation about the axis 50. To this end, the drive member 70 has a plurality of integral ribs 100 at spaced angular locations which extend radially outwardly of the hub portion 74. The ribs 100 have arcuately curved outer surfaces 102 which are adapted to engage a spherically shaped inner surface portion 103 of a bearing plate 104. The bearing plate 104 has an outer periphery which is suitably secured to the housing 40 so as to be held stationary. The lower end portion 105 of the end piece 82 is spherically shaped and is rotatably seated in a hemi-spherical depression 110 in an end cap 112 suitably secured to the bottom side of the housing 40 (see FIG. 2). The ribs 102 and the spherical portion 105 of the end piece 82 are thus rotatably supported within the spherical depression 110 of the end cap 112 and the spherical portion 103 of the bearing plate 104 to cause the drive member 70 to be rotatably supported for rotation about the axis 50. The drive member 70 is adapted to be rotated by a selectively energizable electric motor 113 carried by the housing 40 and having an output shaft 114. The output shaft 114 carries a worm gear 115 which is in meshed engagement with the drive member 70, as shown in FIG. 7.

It should be pointed out at this point that during normal running operation of the wipers 17, the annular element 44 is not rotated and the relative position of the crank shaft 58 with respect to the annular element 44 and the drive member 70 is as shown in FIG. 2. As shown in FIG. 2, the crankshaft 58 will be rotated about its axis 54 to rotate the crank arm 25 through an orbit having a radius $R_1$. When wiper operation is being terminated, and the crank arm 25 is in the solid line position shown in FIG. 2, the annular element 44 will be rotated with the crankshaft 58 for 180° to cause the crankshaft 58 to be also swivelled about the axis 50, which movement increases the throw of the crank arm to the radius $R_2$ to effect movement of the wipers 17 toward their parked position. The annular element 44, as it rotates 180°, causes the crankshaft 58 to be swivelled about the axis 50 from its solid line position shown in FIG. 2 to the position shown in FIG. 4.

The rotational movement of the annular element 44 approximately 180° to increase the throw of the crank arm 25 is effected by a parking mechanism 150. The parking mechanism 150 comprises a plate member 152 which is slidably received within a pair of diametrically aligned notches 154 in the sidewall of the hub portion 74. The hub portion 74 at the bottom of the notches 154 slidably supports the plate member 150 and the hub portion defining the sides of the notches 154 engage the sides of the plate member 152 to provide a driving connection between the plate member 152 and the annular member 70. The plate member is held in abutting engagement with the hub portion 74 via a snap ring 157 which is received within peripheral groove 158 adjacent the upper end of the hub portion 74. The plate member 152 has an elongated slot 159 therethrough through which the crankshaft 58 extends. The plate member 152 at its left end, as viewed in FIG. 2, has an upraised end portion or flange 162 and a downturned end portion or flange 164. The downturned end portion 164 is located closer to the axis 54 of the crankshaft than the end portion 162. The end portions 162 and 164 lie side by side, as shown in FIG. 3.

Figure 4:
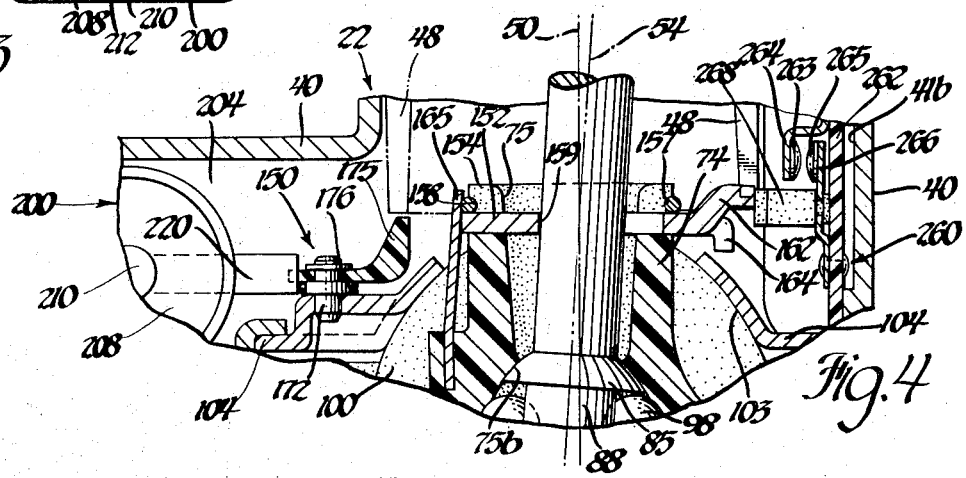
FIG. 4 is a fragmentary sectional view of part of the actuating mechanism shown in FIG. 2, but showing different parts thereof in different positions.

The plate member 152 is adapted to be slidably moved radially of the crankshaft 58 between a first position, as shown in FIG. 4, and a second position, as shown in FIG. 2. When the plate member is in its first position, as shown in FIG. 4, the end portion 162 thereof is moved through a path or orbit in which it will engage the depending leg 48 on the annular member 44 to effect rotation of the annular member 44 with the drive member 70 and the crankshaft 58. When the plate member is moved to its second position, as shown in FIG. 2, the end portion 162 is rotated through a path or orbit in which it will not engage the depending leg 48 of the annular member 44 and thus will not effect rotation of the annular member 44 with the crankshaft 58. The plate member 152 is adapted to be biased toward its first position by a leaf spring 165 having one end secured to the hub portion 74 of the drive member 70 and its other end in abutting engagement with the right end of the plate member 152.

Figure 5:
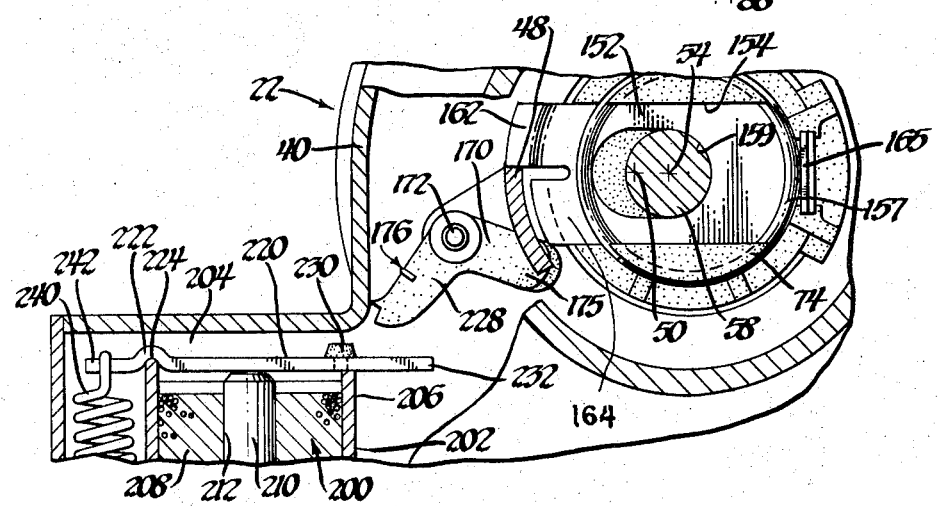
FIG. 5 is a fragmentary sectional view like that shown in FIG. 3, but showing different parts thereof in different positions.
Figure 6:
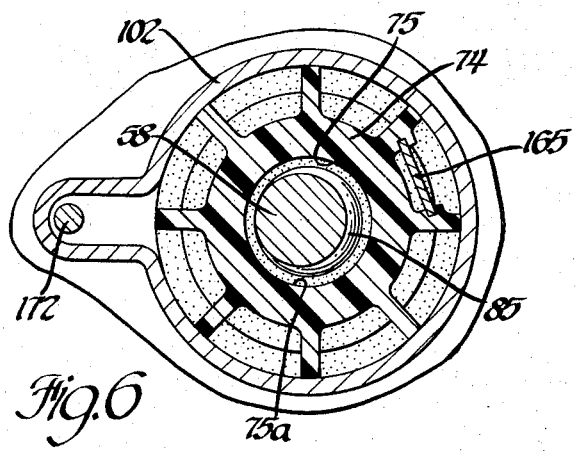
FIG. 6 is a fragmentary section view taken approximately along line 6—6 of FIG. 2.

Movement of the plate member 152 between its first and second positions is controlled by a pivotal cam member 170. The cam member 170 is generally L shaped and is pivotally connected intermediate its ends to the plate member 104 by a pivot pin 172. The cam member 170 is movable between a first position, as shown in FIG. 3, and a second position, as shown in FIG. 5. When the cam member 170 is in its first position, its leg 175 is disposed within the path of movement of the downturned end portion 164 of the plate 152. It should be noted that the leg 175 has a convex or rounded end and that the downturned leg 164 has an outer peripheral surface which is concentric with that of the hub portion 74. When drive member 70 and the plate 152 are rotated and the cam member 170 in its first position, as shown in FIG. 3, the downturned leg 164 will engage the cam member 170 and the plate member 152 will be cammed toward the right toward its second position, as shown in FIG. 2. As the cam member 152 is moved toward its second position, the upturned end portion 162 thereof will clear the depending leg 48 so as to prevent the drive member 70 from drivingly engaging the annular element 44. When the downturned end portion 164 of the drive member 152 has cleared the cam portion 170, the leaf spring 165 will return the drive member 152 towards its first position. By that time, however, the end portion 164 will have been rotated past the depending leg 48. The cam member 170 is normally biased towards its first position, as shown in FIG. 3, by its torsion spring 176 having one end secured to the cam member and its other end secured to the plate 104.

Figure 3:
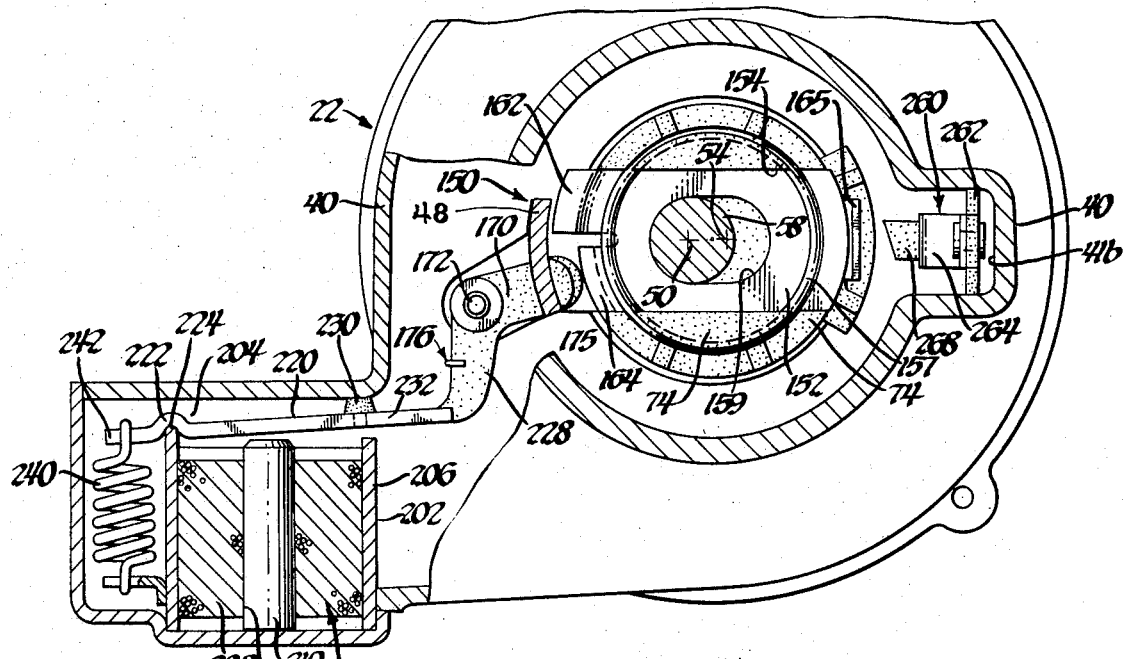
FIG. 3 is a fragmentary sectional view taken approximately along line 3—3 of FIG. 2.

The cam member 170 is normally held in its first position, as shown in FIG. 3, by a control mechanism 200. The control mechanism 200 comprises a solenoid 202 carried by the housing means 40 and located in a compartment 204 adjacent one side of the housing means 40. The solenoid 202 comprises a frame 206, an annular solenoid coil 208 and central core 210 received within a central opening 212 within the solenoid coil 208. The control mechanism 200 further includes a pivotally supported lever or armature 220. The lever 220 has a bend or crook 222 adjacent its left end which is received within a notch 224 in the frame 206. The lever 220 is movable between a first position, as shown in FIG. 3, and a second position, as shown in FIG. 5. When the lever member 220 is in its first position, as shown in FIG. 3, a pivot 230 secured to the lever 220 intermediate its ends is in abutting engagement with the housing means 40 and the lever 220 has its free end 232 positioned so that it engages the other leg 228 of the cam 170 so as to prevent the cam 170 from being pivoted in a clockwise direction, as viewed in FIG. 3. The lever 220 is biased to its first position by a tension spring 240 having one end secured to the frame 206 and its other end secured to the lever 220 at its end 242 adjacent the pivot 224. The lever 220 is retained in its first position by the tension spring 240 during running operation on the wipers so that the cam 170 causes the plate member 152 to be moved from its first position, as shown in FIG. 4, to its second position, as shown in FIG. 2, during each revolution as it approaches the depending leg 48 of the annular element 44. This prevents driving engagement between the plate 152 and the annular element 44 during running operation of the wipers 17.

The lever 220 is movable from its first position, as shown in FIG. 3, to a second position, as shown in FIG. 5, in response to energization of the solenoid coil 208. When the lever 220 is in its second position, its free end 232 does not engage the cam 170 whereby the depending flange 164 of the plate member 152 causes the cam 170 to be pivoted in a clockwise direction against the bias of the torsion spring 176 when it engages the cam so as to allow the plate member 152 to engage the depending leg 48 and rotate the annular element 44 with the crankshaft 58.

The parking mechanism 150 also includes a park switch assembly 260. The park switch 260 comprises a base 262 which is suitably secured to the housing 40, a stationary contact 264 carried by the base 262, and a mobile contact 265 carried by one end of a leaf spring 266. The spring 266 has its other end secured to the base 262. Secured to the leaf spring 266 intermediate its ends is a plastic actuator or button 268 which extends radially of the crankshaft 58 and which has a bevelled end disposed within the path of movement of the leg 48 of the annular element 44.

The leaf spring 266 normally biases the mobile contact 265 into engagement with the stationary contact 263. The park switch assembly 260 functions to provide a ground path for the wiper motor 113 when wiper operation is being terminated to keep the motor 113 energized until the wipers 17 have been moved to their parked position. The park switch 260 is adapted to be moved to an open position in which the contacts 263 and 265 are separated by the leg 48 of the annular element when the wipers are in their park position.

Operation of the windshield cleaning system A will be described with reference to the schematic control circuit means or diagram shown in FIG. 8. The control circuit means includes a DC battery 300 having one terminal connected via a wire or conductor 301 to a ground $G_1$, the park switch assembly 260, the electric wiper motor 113 which includes an armature 302, and series and shunt field windings 304 and 306, respectively, an ignition switch 310, a resistor 312, the solenoid coil 208, and a manually operable wiper switch 320. The wiper switch 320 could be of any suitable or conventional construction and includes spaced stationary terminals 321, 322, 323, 324, and 325 and a movable bridging member 330. The movable bridging member 330 is movable between an off position, a low speed position, and a high speed position. When in the off position, the bridging member bridges the stationary contacts 321, 322, 323. When in the low speed position, the bridging member bridges contacts 323 and 324, the latter contact being connected via a wire 332 to a ground $G_2$. When the bridging member 330 is in its high speed position, it bridges the stationary contacts 325 and 324.

It should be noted at this point that when the wiper system is in its parked position, the crank assembly and annular element 44 are in the position shown in FIG. 4. In this position, the upper flange 162 of the plate member 152 is in engagement with the depending leg 48 of the annular element 44 and the leg 48 is in engagement with the actuator or button 268 of the park switch assembly 260 and holds the park switch in its open position. Also, when the wiper system is in its parked position, the cam member 170 has been moved by the torsion spring to its first position, as shown in FIG. 3, in which it will be disposed within the path of movement of the plate member 152 and the lever 220 is biased by the spring 240 towards its first position, as shown in FIG. 3, in which it will prevent clockwise pivotal movement of the cam member 170.

Figure 8:
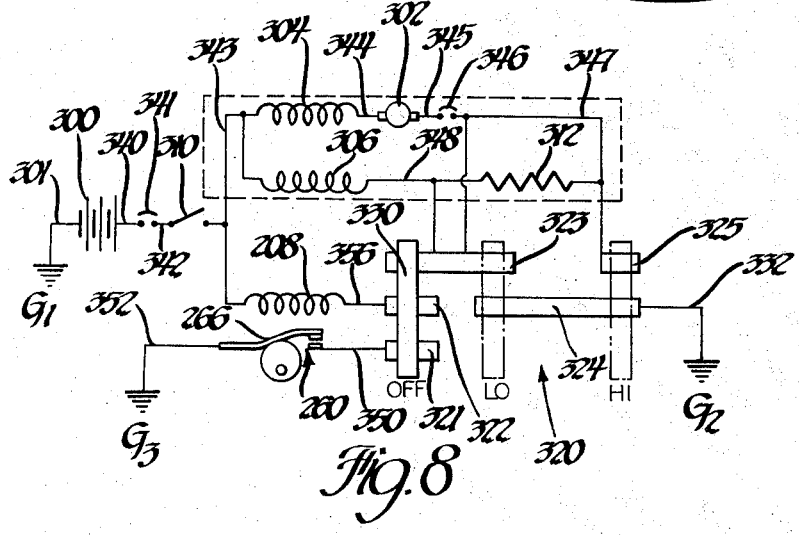
FIG. 8 is a schematic electrical diagram for controlling the operation of the actuating mechanism of the present invention.

When the operator of the vehicle desires slow speed wiper operation of the windshield wiping system, he will move the bridging member 330 of the wiper switch 320 from its off position to its low speed position, as shown by the phantom lines in FIG. 8. When the bridging member is in its low speed position, an electric circuit is completed for energizing the electric motor 113. This circuit is from battery 300, wire 340, circuit breaker 341, wire 342, now closed ignition switch 310, wire 343, series field winding 304, wire 344, armature 302, wire 345, circuit breaker 346, wire 347, stationary terminal 323, bridging member 330, stationary terminal 324, wire 332, to ground $G_2$. A circuit is also completed from wire 343, shunt field winding 306, wire 348, stationary terminal 323, bridging member 330, stationary terminal 324, wire 332 to ground $G_2$. Completion of these circuits energizes the electric motor.

Energization of the electric motor causes the output or armature shaft 114 to rotate the worm 115 which in turn rotates the worm wheel 70. Rotation of the worm wheel or drive member 70 will cause the crankshaft 58 of the crank assembly to be rotated about its axis 54 in the direction of the arrow 26. Rotation of the drive member 70 will also cause the annular element 44 to be rotated as a result of the engagement between the flange 162 and the leg 48. Rotation of the annular element 44 occurs only for approximately 180° because, as the downturned flange 164 of the plate 152 approaches the cam member 170, the plate member 152 will be caused to move from its first position, as shown in FIG. 4, towards its second position, as shown in FIG. 2, to disengage the flange 162 from the leg 48 and discontinue the driving connection between the plate 152 and the annular element 44. During this 180° of rotational movement, however, the crankshaft 58 is swivelled about axis 50 relative to the annular drive member 70 from its position, shown in FIG. 4, to its position, as shown in FIG. 2. This combined rotational and swivelling movement of the crankshaft assembly 24 will cause the wiper blades to move from their parked position P to their outboard position O.

Once the annular element 44 has been rotated 180° to its position in FIG. 2, the crank assembly will thereafter be continuously rotated about the axis 54 for as long as the wiper motor 113 remains energized. The annular element is not rotated during running operation of the wipers due to the fact that upon each revolution, the plate 152 is caused to be cammed from its first position towards its second position shown in FIG. 2, by the cam member 170. It should also be noted that the frictional forces between the annular element 44 and the housing 40 is greater than the frictional resistance between the crankshaft and the bearing 56. Additionally, when the annular element 44 is rotated to its position, as shown in FIG. 2, the leg 48 thereof no longer engages the actuator or button 268 of the park switch assembly 260 and the leaf spring 266 self biases contact 265 into engagement with contact 263.

When the operator desires high speed operation, he will move the bridging member 330 of the wiper switch 320 to its high speed position, as indicated by the dotted lines in FIG. 8. Movement of the bridging member 330 to this position causes only the stationary terminal 325 and 324 of the wiper switch 320 to be bridged. When in this position, electric circuits for the series field windings 304 and the armature 302 are completed from wire 347, stationary terminal 325, bridging member 330, wire 332 to ground $G_2$. The hereinbefore described circuit for energizing the shunt field winding 306 to ground $G_2$ is not completed, since the bridging member 330 does not bridge the stationary terminal 323 in the high speed position. When the bridging member 330 is moved to a high speed position, the shunt field windings 306 are energized via a circuit through resistor 312 to ground $G_2$ whereby the shunt field windings are only partially energized which causes the wiper motor to operate at high speed, and in a manner well known to those skilled in the art. This latter circuit is from battery 300, wire 340, circuit breaker 341, wire 342, now closed ignition switch 310, wire 343, shunt field winding 306, wire 348, resistor 312, wire 347, stationary terminal 325, bridging member 330, stationary terminal 324, wire 332 to ground $G_2$.

Movement of the bridging member to the high speed position causes the actuating mechanism to move the wipers from their depressed parked position to their outboard position, and in the same manner as described above in connection with low speed operation.

When the wiper switch bridging member 330 is moved from either its high or low speed position to its off position to terminate wiper operation, the hereinbefore described circuits for the series field windings and armature and shunt field windings for the wiper motor 113 are broken, since the bridging member is no longer engaged with stationary terminal 324 which is connected to ground $G_2$. The wiper motor, however, remains energized until the wipers reach their park position, since the park switch assembly 266 is self biased toward a closed position during running operation of the wipers 17. The park switch 260 remains closed until the windshield wiper motor moves the wipers to their park position at which time the leg 48 of the annular element 44 will open the park switch to deenergize the wiper motor. When the bridging member 330 has been moved to its off position, it provides a ground path for the series field windings and armature and shunt field windings 306 via stationary terminal 323, bridging member 330, stationary terminal 321, wire 350, park switch 260, wire 352 to ground $G_3$. Also, when the bridging member is moved to its off position, a circuit for energizing the solenoid 208 is completed. This circuit is from battery 300, wire 340, circuit breaker 341, wire 342, now closed ignition switch 310, wire 343, solenoid coil 208, wire 256, stationary contact 323, bridging member 330, stationary contact 321, wire 350, park switch 266, wire 352 to ground $G_3$. Energization of the solenoid coil 208 causes the lever 220 to be moved from its first position, as shown in FIG. 3, toward its second position as shown in FIG. 5. When the lever 220 is in the second position, as shown in FIG. 5, the cam 170 can be pivoted in the clockwise direction.

When the wiper switch 320 is moved to its off position, the motor 113 remains energized through the park switch 266 and the crank shaft assembly 24 continues to rotate about its axis 54. When the wipers are in their outboard position O, the parts will be in the position shown by the solid lines in FIG. 2. As the drive member 70 is rotated toward the solid line position shown in FIG. 2, the plate member 152 will engage the cam member 170 and pivot it in a clockwise direction so as to be out of the way and the end flange 162 will engage the depending leg 48 of the annular element 44. Continued rotation of the drive member 70 and crank assembly 24 causes the annular element 44 to be rotated about its axis 50. As the annular element is rotated, the crankshaft 58 is swivelled about the axis 50 due to the eccentricity of the hub portion 52. This swivelling movement of the crank arm 25 increases its throw or radius from $R_1$ to $R_2$. When the annular element has been rotated approximately 180°, the depending leg 48 will engage the actuator 268 of the park switch 260 and cause the park switch 260 to be moved to its open position, as shown in FIG. 4. When the park switch has been moved to its open position, it deenergizes the circuit for the wiper motor to ground $G_3$ and also deenergizes the solenoid coil 208. The swivelling movement of the crank shaft assembly 24 in addition to the rotational movement imparted thereto causes the wipers 17 to be moved beyond their normal inboard position I to a depressed park position P within the slot 19.

Although the illustrated embodiment hereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. An actuating mechanism for use in oscillating a pair of windshield wipers across a windshield between inboard and outboard positions during running operation and to move the wipers to a depressed park position spaced from the inboard position when wiper operation is being terminated comprising:

a housing means;
an annular element rotatably supported by said housing for rotation about a given axis;
a drive member spaced from said annular element and rotatably supported by said housing for rotation about said given axis;
drive means for driving said drive member;
said annular element having an opening therethrough whose central axis is eccentric to and skewed with respect to said given axis;
a crank assembly including a crank arm and a crankshaft extending through said opening and rotatably supported by said annular element for rotation about said central axis of said opening;
connection means for swivelly and drivingly connecting said crankshaft to said drive member; and
a parking mechanism operatively associated with said drive member and said annular element,
said parking mechanism being operable to effect rotation of said crank assembly about said central axis only during running operation to rotate said crank arm through an orbit having a first radius in which the wipers will be oscillated between their inboard and outboard positions during running operation, said parking mechanism being operable to drivingly connect said annular element to said drive member to rotate said element and crank assembly together to effect both rotational movement of said crank assembly about said central axis and to effect swivelling movement of said crank assembly relative to said given axis to increase the radius of the orbit of said crank arm to move the wipers to their depressed park position when wiper operation is being terminated.

2. In a windshield wiping system having a pair of wipers which are adapted to be oscillated across a windshield of an automotive vehicle between inboard and outboard positions during running operation and moved to a depressed park position spaced from the inboard position when wiper operation is being terminated, an actuating mechanism including a rotatable crank arm and a drive transmission operatively connected to the crank arm and the wipers for effecting oscillation of the wipers in response to rotational movement of the crank arm, the improvement being that said actuating mechanism comprises:

a housing means;
an annular element rotatably supported by said housing means for rotation about a given axis;

a drive member spaced from said annular element and rotatably supported by said housing means for rotation about said given axis;

drive means for driving said drive member;

said annular element having an opening therethrough whose central axis is eccentric to and skewed with respect to said given axis and said annular element having an axially extending leg extending towards said drive member;

a crank assembly including said crank arm and a crank shaft secured at one end to said crank arm, said crank shaft extending through said opening and being rotatably supported adjacent its one end by said annular element for rotation about said central axis of said opening in said annular element; connection means for swively and drivingly connecting said crank shaft at its other end to said drive member; and a parking mechanism operatively associated with said drive member and said annular element, said parking mechanism comprising a first member drivingly connected to, but slidably supported by said drive member for radial movement toward and from the crank shaft between a first position in which one end portion thereos is engageable with said depending leg of said annular element to cause the latter to be rotated with the drive member and a second position in which said end portion of the first member does not engage the depending leg to allow the crank shaft to rotate relative to the annular element, spring means for biasing said first member toward its first position, a cam member pivotally supported by said housing for movement between first and second positions, said cam member when in its first position having one end thereof disposed within the path of movement of said first member and being engageable with a second portion of said first member to cause said first member to be moved in opposition to the biasing force of said spring means from its first position towards its second position to allow the first end portion thereof to pass clear of the depending leg to prevent driving engagement between the annular drive member and the annular element, said cam member when in its second position allowing said first member to remain in its first position so that it engages the depending leg of the annular element to cause the annular element to be rotated with the annular drive member, selectively operable means including a lever which is movable between a first position in which it prevents movement of the cam member from its first position towards its second position and a second position in which it permits the first member to move the cam member from its first position towards its second position, a park switch means having normally closed contacts and which is disposed within the path of movement of the depending leg of the annular element so as to be trippable thereby when the annular element is rotated with the annular drive member, said selectively operable means holding said cam member in its first position during running operation of the wipers whereby said first member does not drivingly engage the annular element so that the crank arm is rotated only about said central axis through a first orbit having a given radius so as to effect oscillation of the wipers between their inboard and outboard positions, said selectively operable means moving said lever to its second position to allow said cam member to be pivoted from its first position to its second position by said first member being terminated to allow said first member to engage the depending leg of the annular element to cause said crank assembly to be rotated about said central axis and swivelly moved about said given axis to increase the throw of the crank arm to move the wipers to their depressed park position, said depending leg moving said park switch to its open position to deenergize the drive means when said wipers reach their park position.

* * * * *